Aug. 12, 1924.

G. F. ECKART

FLEXIBLE COUPLING

Filed June 18, 1923

1,504,749

Inventor:
George F. Eckart,
By Dyrenforth, Lee, Chritton & Wiles,
Attys.

Patented Aug. 12, 1924.

1,504,749

UNITED STATES PATENT OFFICE.

GEORGE F. ECKART, OF CINCINNATI, OHIO.

FLEXIBLE COUPLING.

Application filed June 18, 1923. Serial No. 645,994.

*To all whom it may concern:*

Be it known that I, GEORGE F. ECKART, a citizen of the United States, residing at Cincinnati, in the county of Hamilton and State of Ohio, have invented a new and useful Improvement in Flexible Couplings, of which the following is a specification.

Figure 1:
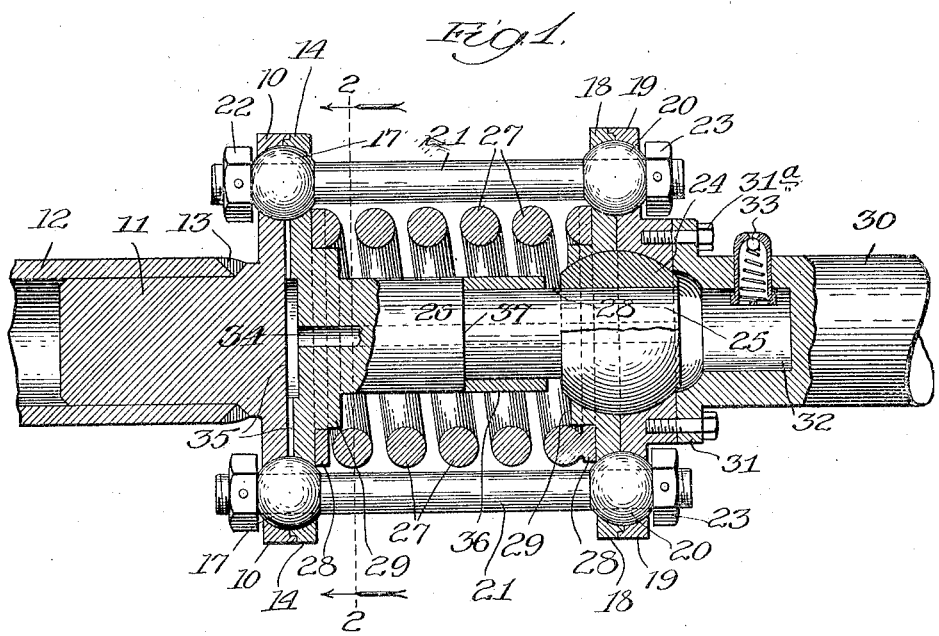
Figure 2:
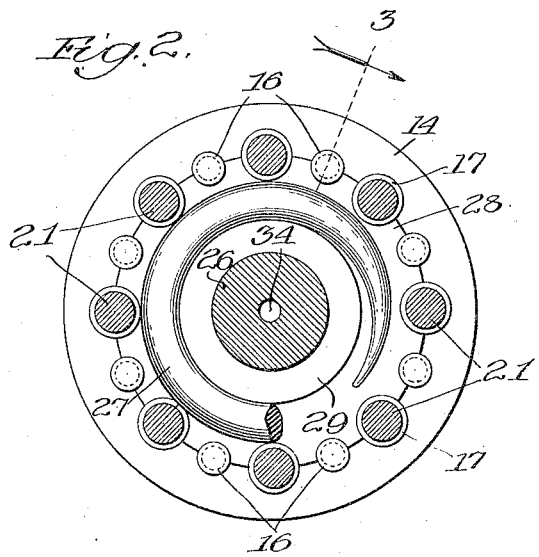
Figure 3:
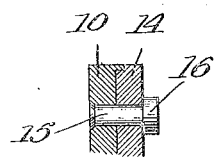

This invention relates to flexible couplings or the like and is fully described in the following specification as shown in the accompanying drawings in which, Figure 1 is a longitudinal section through the coupling, Fig. 2 is a transverse section on the lines 2—2 of Fig. 1 showing the driving washer and, Fig. 3 is a partial section on the line 3 of Fig. 2.

The coupling illustrated comprises a flange 10 having a central stub shaft 11 which is secured to a propeller shaft or the like 12 by any suitable means such as by welding along the annular groove 13.

The corresponding flange 14 is secured to the driving flange 10 by means of rivets 15 as shown in Figs. 2 and 3. These rivets preferably have fillister heads 16 which serve as driving members as will later be explained. A series of spherical socket joints are formed in the facing flanges 10 and 14 in which the balls 17 are slidably mounted.

Two facing flanges 18 and 19 are similarily riveted together and have a series of balls 20 mounted therein corresponding to the series of balls 17 in the first mentioned flanges. These balls have axial bores and a rod 21 is slidably mounted in each pair of balls, and is adjustably held therein by means of nuts 22 and 23.

The flanges 18 and 19 have an axial spherical socket in which is mounted a spherical member 24 having a central bore which is adapted to receive the reduced end 25 of a stub shaft 26 which is formed integral with the flange 14. This insures that the flanges 18 and 19 will be held in alinement with the shaft 26 and propeller shaft 12. The spring 27 is held under tension between the flanges 14 and 18 by the rods 21 and the nuts 22 and 23. This spring is brazed at its ends to rings 28 and these are centered on the shoulders 29 on the flanges 14 and 18. The rings 28 loosely surround the balls 17 and 20 and fit quite accurately around the fillister rivet heads 16.

A driven shaft 30 has a flanged end 31 which is secured to the flange 19 by means of screws 31ª. This shaft has a hollow chamber 32 to which oil may be supplied through the ball oiler 33. The shaft 26 has an axial hole 34 therethrough, through which oil may be supplied through channels 35 to the balls 17.

From the foregoing, it will be understood that as power is applied to the propeller shaft 12, this power will be transmitted through the spring 27 to the driven shaft 30, and that as the torque is increased with increased loads, the flange 14 will tend to turn with respect to the flange 18 with the result that the rods 21 which act in this instance as radius rods, will cause the flanges 14 and 18 to approach each other, thereby causing the spherical member 24 to slide inwardly on the reduced end 25 of the shaft. In some instances it is desirable that the flexibility of the coupling should be limited. For this reason I have provided a collar 36 which fits snugly over the reduced end 25 of the shaft 26 and bears upon the shoulder 37 so that when the spherical member 24 moves inwardly a predetermined distance it will engage the collar 36 and any increase in the torque will then cause the flexible coupling to drive substantially as a solid member. The amount of permissible torsional movement depends upon the opening 38 between the spherical member 24 and the end of the collar 36. By inserting collars of varying length or by inserting shims between the shoulder 37 and the collar 36, the space 38 may be varied. If this space has been determined in advance, the collar 36 may be omitted altogether and the shoulder 37 moved up so as to give the desired opening 38.

It will be also understood that owing to the fact that the rods 21 are freely slidable through the balls 17 and 20 the coupling will operate successfully even though the shaft 30 is running at a considerable angle to the shaft 12.

While I have shown and described but a single embodiment of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as possible in view of the prior art.

What I claim as new and desire to secure by Letters Patent, is:

1. In a flexible coupling, a pair of opposing flanges, a series of members flexibly connecting said flanges, a compression spring holding said flanges outwardly against said members, a shaft extending between the flanges for holding them in alinement, and means on said shaft for limiting the movement of said flanges.

2. In a flexible coupling, a pair of opposing flanges, a series of members flexibly connecting said flanges, a compression spring holding said flanges outwardly against said members, a shaft extending axially from one flange and journalled in the other, and means on said shaft for limiting the movement of said flanges.

3. In a flexible coupling, a pair of opposing flanges, a series of members flexibly connecting said flanges, a compression spring holding said flanges outwardly against said members, a hollow spherical member mounted axially on one flange, a shaft extending from the other flange and slidable in the hollow spherical member, and means on said shaft for limiting the movement of said flanges.

4. In a flexible coupling, a pair of opposing flanges, a series of members flexibly connecting said flanges, a compression spring holding said flanges outwardly against said members, a hollow spherical member mounted axially in one flange, a shaft extending from the other flange and slidable in the hollow spherical member, and a shoulder on said shaft adapted to engage said spherical member for limiting the movement of said flanges.

5. In a flexible coupling, a pair of opposing flanges, a series of members flexibly connecting said flanges, a compression spring holding said flanges outwardly against said members, a hollow spherical member mounted axially in one flange, a shaft extending from the other flange and slidable in the hollow spherical member, a shoulder on said shaft, a collar on said shaft bearing against said shoulder and adapted to engage said spherical member for limiting the movement of said flanges.

6. In a flexible coupling, a pair of opposing flanges, a series of members flexibly connecting said flanges including balls movably mounted in said flanges, a compression spring holding said flanges outwardly against said members, a hollow spherical member mounted axially in one of said flanges, a shaft extending between the flanges for holding them in alinement, and slidable in said hollow member and means for lubricating said spherical member and said balls.

7. In a flexible coupling, a pair of opposing flanges, a series of members flexibly connecting said flanges including balls movably mounted in said flanges, a compression spring holding said flanges outwardly against said members, a hollow spherical member mounted axially in one of said flanges, a shaft extending between the flanges for holding them in alinement and slidable in said hollow member, an opening in said shaft communicating with said spherical member and with said balls and means for supplying lubricant to said opening.

GEORGE. F. ECKART.